(12) United States Patent
    Malhotra et al.

(10) Patent No.: US 12,615,189 B2
(45) Date of Patent: Apr. 28, 2026

(54) SYSTEMS AND METHODS FOR STATISTICS BASED AND TOPOLOGY BASED INTEROPERABLE AI/ML MODEL MONITORING

(71) Applicant: InterDigital Patent Holdings, Inc., Wilmington, DE (US)

(72) Inventors: Akshay Malhotra, San Jose, CA (US); Yugeswar Deenoo Narayanan Thangaraj, Chalfont, PA (US); Nicolas Zilberstein, Houston, TX (US); Shahab Hamidi-Rad, Sunnyvale, CA (US); Mohamed Salah Ibrahim, Chesterbrook, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 6 days.

(21) Appl. No.: 18/889,096

(22) Filed: Sep. 18, 2024

(65) Prior Publication Data

US 2026/0081841 A1     Mar. 19, 2026

(51) Int. Cl.
    *H04L 41/12* (2022.01)
    *H04W 28/06* (2009.01)

(52) U.S. Cl.
    CPC ............. *H04L 41/12* (2013.01); *H04W 28/06* (2013.01)

(58) Field of Classification Search
    CPC ............................... H04L 41/12; H04W 28/06
    See application file for complete search history.

(56) References Cited

U.S. PATENT DOCUMENTS

| | | | | |
|---|---|---|---|---|
| 6,631,128 B1 * | 10/2003 | Lemieux | ................. | H04L 41/12 |
| | | | | 370/230 |
| 2014/0364079 A1 * | 12/2014 | DiFazio | ................ | H04W 36/22 |
| | | | | 455/418 |
| 2025/0310828 A1 * | 10/2025 | Yatribi | .................. | H04L 1/0026 |

FOREIGN PATENT DOCUMENTS

| | | |
|---|---|---|
| CN | 113704641 A | 11/2021 |
| CN | 115269357 B | 2/2023 |

(Continued)

OTHER PUBLICATIONS

3GPP TS 38.321 V17.2.0 , "NR; Medium Access Control (MAC) Protocol Specification (Release 17)", 3rd Generation Partnership Project Technical Specification Group Radio Access Network, Sep. 2022, 246 pages.

*Primary Examiner* — Kostas J Katsikis
(74) *Attorney, Agent, or Firm* — Flaster Greenberg, P.C.

(57)     ABSTRACT

A method implemented by a wireless transmit/receive unit (WTRU) may include receiving configuration information including an indication of topology methods used to evaluate topology of a dataset, a metric associated with topology methods, and an identification associated with each topology method. A topology method may be selected from the topology methods indicated by the configuration information. Topological features of the dataset in the input data space and the latent data space may be determined using the selected topology method. Input space topological features may be compared to latent space topological features to determine whether a WTRU-side model satisfies the metric associated with the selected topology method, including training the WTRU-side model such that topological features in the input and latent spaces satisfy the metric. An interoperability report may be sent, including the identification associated with the selected topology method and an (Continued)

300 ─

UE Side training

NW Side training

Recon. Loss + $\lambda_1$ * (Statistics based Loss)

Recon. Loss + $\lambda_2$ * (Statistics based Loss)

UE Send Latent Space Statistics
Or Latent Space Statistics defined by Standards indication of whether the WTRU-side model satisfies the metric.

20 Claims, 6 Drawing Sheets

(56) References Cited

FOREIGN PATENT DOCUMENTS

| | | |
|---|---|---|
| CN | 117674926 A | 3/2024 |
| EP | 4572171 A1 | 6/2025 |
| WO | 2024097614 A1 | 5/2024 |

* cited by examiner

SYSTEMS AND METHODS FOR STATISTICS BASED AND TOPOLOGY BASED INTEROPERABLE AI/ML MODEL MONITORING

BACKGROUND

In the context of Channel State Information (CSI) reporting, Channel State Information may include one or more of a channel quality index (CQ), a rank indicator (RI), a precoding matrix index (PMI), L1 channel measurements such as Reference Signal Received Power (RSRP) and/or Signal-to-Interference-plus-Noise Ratio (SINR), a CSI-RS resource indicator (CRI), a Synchronization Signal/Physical Broadcast Channel (SS/PBCH) block resource indicator (SSBRI), a layer indicator (LI), and/or any other measurement quantity determined by the WTRU from the configured reference signals (e.g., CSI-RS, SS/PBCH block, and/or any other applicable reference signal).

SUMMARY

A wireless transmit/receive unit (WTRU) may include a processor. The processor may be configured to receive configuration information. The configuration information may include an indication of one or more topology methods used to evaluate a topology of a dataset, a metric associated with at least one topology method, and an identification associated with each topology method. A topology method may be selected out of the one or more topology methods indicated by the configuration information. Topological features of the dataset in the input data space may be determined using the selected topology method, and topological features of the dataset in the latent space may be determined using the selected topology method. The input space topological features may be compared to the latent space topological features to determine whether a WTRU-side model satisfies the metric associated with the at least one topology method. An interoperability report may be sent. The interoperability report may include the identification associated with the selected topology method and may include an indication of whether the WTRU-side model satisfies the metric associated with the at least one topology method. The determination of whether the WTRU-side model satisfies the metric associated with the selected topology method may include training the WTRU-side model such that the topological features in the input space, determined using the selected topology method, and the topological features in the latent space, determined using the selected topology method, satisfy the metric associated with the at least one topology method.

The WTRU-side model may be associated with an encoder that may be used for channel state information (CSI) generation.

Each topology method may include an algorithm which may be used to evaluate the topology of one or more datasets with the WTRU-side model to achieve interoperability between the WTRU-side model and a Network-side model.

Each topology method may be associated with a methodology to find a connectivity or topology in a given set of datapoints for a dataset. The methodology may include determining one or more simplicial complexes based on one or more of a predefined distance metric or similarity metric.

The configuration information may include an indication that the dataset may be associated with the selected topology method.

The identification associated with each topology method may identify one or more use-cases that may be associated with the topology method.

The processor may be configured to determine a performance metric associated with the selected topology method. The performance metric may include one or more of Normalized Mean Square Error (NMSE), Squared Generalized Cosine Similarity (SGCS), or a classification accuracy.

The interoperability report may include an identity of a test data set used for interoperability testing, an indication of a topology of the test data set in the latent space, an indication of topological features of the test data set in the latent space, or a value of topological loss between the test data set in the input data space and the test data set in the latent space.

The indication of whether the WTRU-side model may be compatible with the dataset may include at least a portion of the dataset in the latent space.

The processor may be configured to train the WTRU-side model by determining one or more pair-wise distances between samples in the dataset using a predefined distance metric. One or more simplicial complexes may be determined based on the pair-wise distances. Each simplicial complex may correspond to a minimum spanning tree. Minimum spanning trees associated with one or more of the data points in both the input data space and the latent space may be determined. Topological features may be determined by comparing the minimum spanning trees of the input data space and the latent space. The WTRU-side model may be updated based on the comparing to enforce similarity in topology between the input data space and the latent space.

A method implemented by a wireless transmit/receive unit (WTRU) may include receiving configuration information. The configuration information may include an indication of one or more topology methods used to evaluate a topology of a dataset, a metric associated with at least one topology method, and an identification associated with each topology method. A topology method may be selected out of the one or more topology methods indicated by the configuration information. Topological features of the dataset in the input data space may be determined using the selected topology method, and topological features of the dataset in the latent space may be determined using the selected topology method. The input space topological features may be compared to the latent space topological features to determine whether a WTRU-side model satisfies the metric associated with the at least one topology method. An interoperability report may be sent. The interoperability report may include the identification associated with the selected topology method and may include an indication of whether the WTRU-side model satisfies the metric associated with the at least one topology method. The determination of whether the WTRU-side model satisfies the metric associated with the selected topology method may include training the WTRU-side model such that the topological features in the input space, determined using the selected topology method, and the topological features in the latent space, determined using the selected topology method, satisfy the metric associated with the at least one topology method.

The WTRU-side model may be associated with an encoder that may be used for channel state information (CSI) generation.

Each topology method may include an algorithm which may be used to evaluate the topology of one or more datasets with the WTRU-side model to achieve interoperability between the WTRU-side model and a Network-side model.

Each topology method may be associated with a methodology to find a connectivity or topology in a given set of datapoints for a dataset. The methodology may include determining one or more simplicial complexes based on one or more of a predefined distance metric or similarity metric.

The configuration information may include an indication that the dataset may be associated with the selected topology method.

The identification associated with each topology method may identify one or more use-cases that may be associated with the topology method.

The method may include determining a performance metric associated with the selected topology method. The performance metric may include one or more of Normalized Mean Square Error (NMSE), Squared Generalized Cosine Similarity (SGCS), or a classification accuracy.

The interoperability report may include an identity of a test data set used for interoperability testing, an indication of a topology of the test data set in the latent space, an indication of topological features of the test data set in the latent space, or a value of topological loss between the test data set in the input data space and the test data set in the latent space.

The indication of whether the WTRU-side model may be compatible with the dataset may include at least a portion of the dataset in the latent space.

The method may include training the WTRU-side model by determining one or more pair-wise distances between samples in the dataset using a predefined distance metric. One or more simplicial complexes may be determined based on the pair-wise distances. Each simplicial complex may correspond to a minimum spanning tree. Minimum spanning trees associated with one or more of the data points in both the input data space and the latent space may be determined. Topological features may be determined by comparing the minimum spanning trees of the input data space and the latent space. The WTRU-side model may be updated based on the comparing to enforce similarity in topology between the input data space and the latent space.

A wireless transmit/receive unit (WTRU) may include a processor. The processor may be configured to train a WTRU-side model of a two-sided model for channel state information (CSI) compression. The training may be performed independently from a network-side model to satisfy topology-related criteria. A data topology for training the WTRU-side model may be determined using a single method $M_i$. The method $M_i$ may include identifying the topology of received input data and may include extracting topological features from the input data. The input data may be mapped prior to evaluating connectivity in the data topology. Connected components of the input data may be evaluated using a distance measure and a weighting factor may be applied. A pre-defined topology may be enforced in a latent space of the WTRU-side model to match a topology which may be defined by at least one of the network-side model or by a standard. An indication related to topological compatibility testing of the WTRU-side model with respect to the network-side model may be sent. The indication may include an identity of the method used for compatibility testing and may include topological features of a test data set in the latent space. The determination of whether the WTRU-side model satisfies the metric associated with the selected topology method may include training the WTRU-side model such that the topological features in the input space, determined using the selected topology method, and the topological features in the latent space, determined using the selected topology method, satisfy the metric associated with the at least one topology method.

DETAILED DESCRIPTION

Figure 1A:
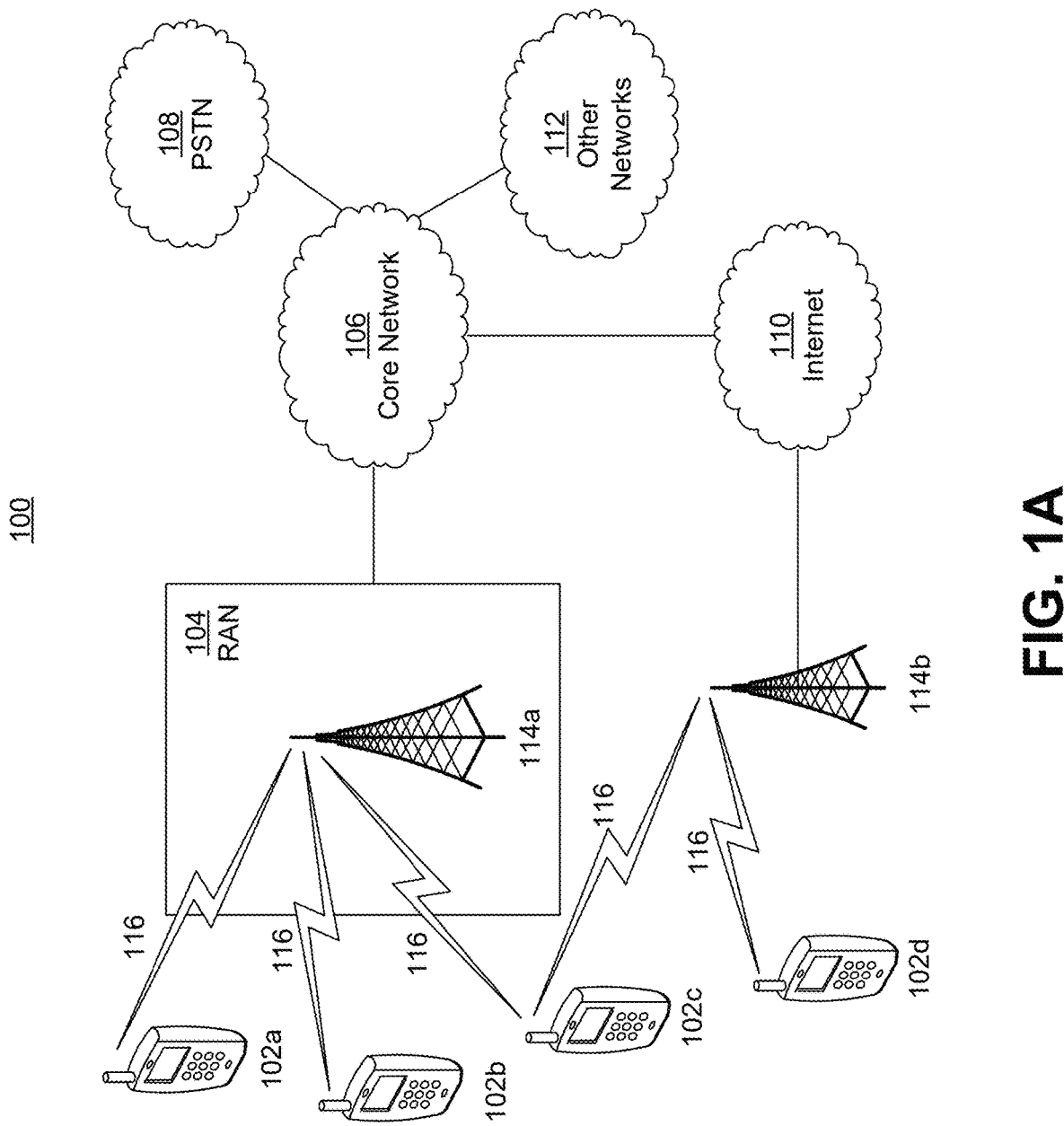
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
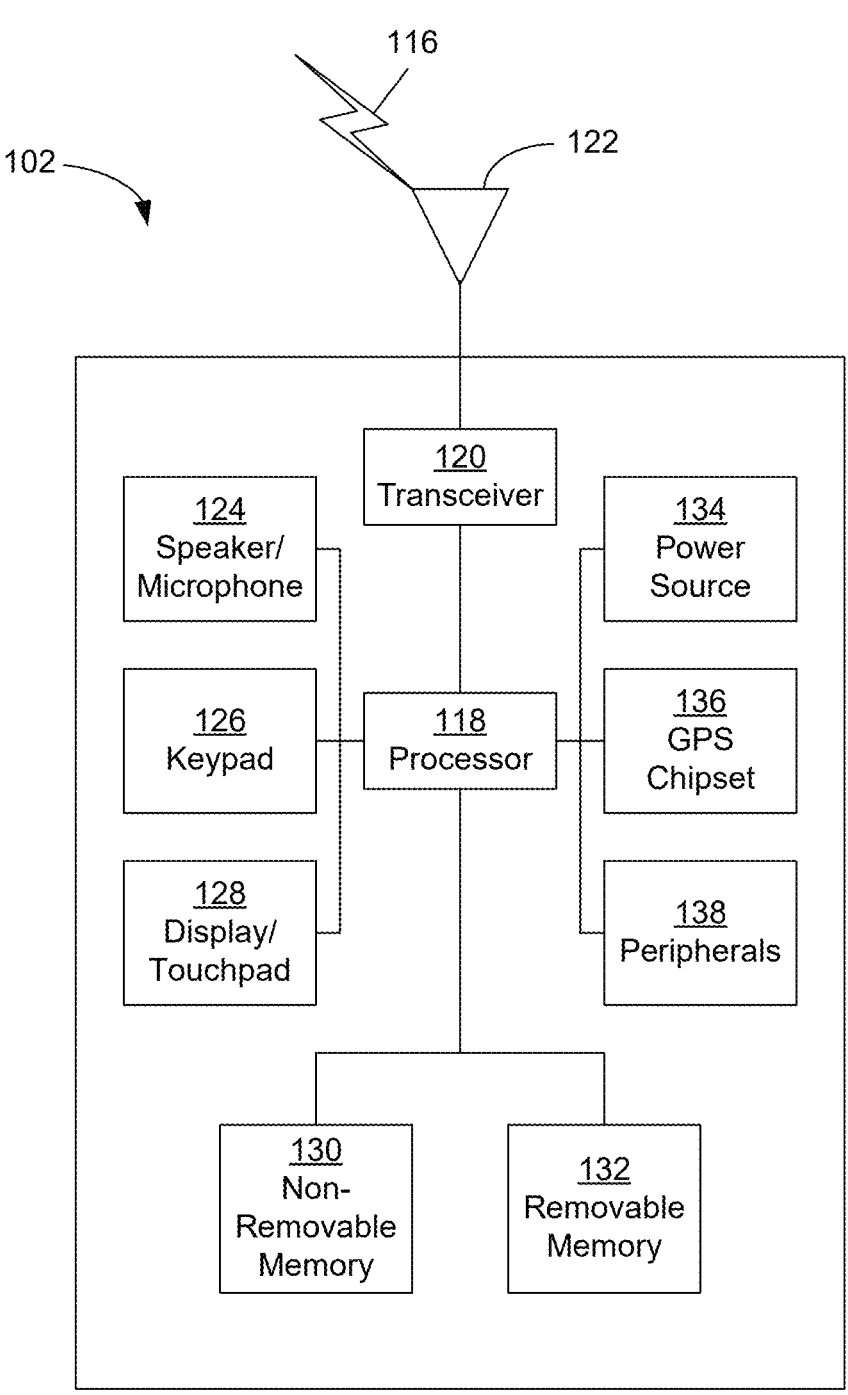
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and/or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
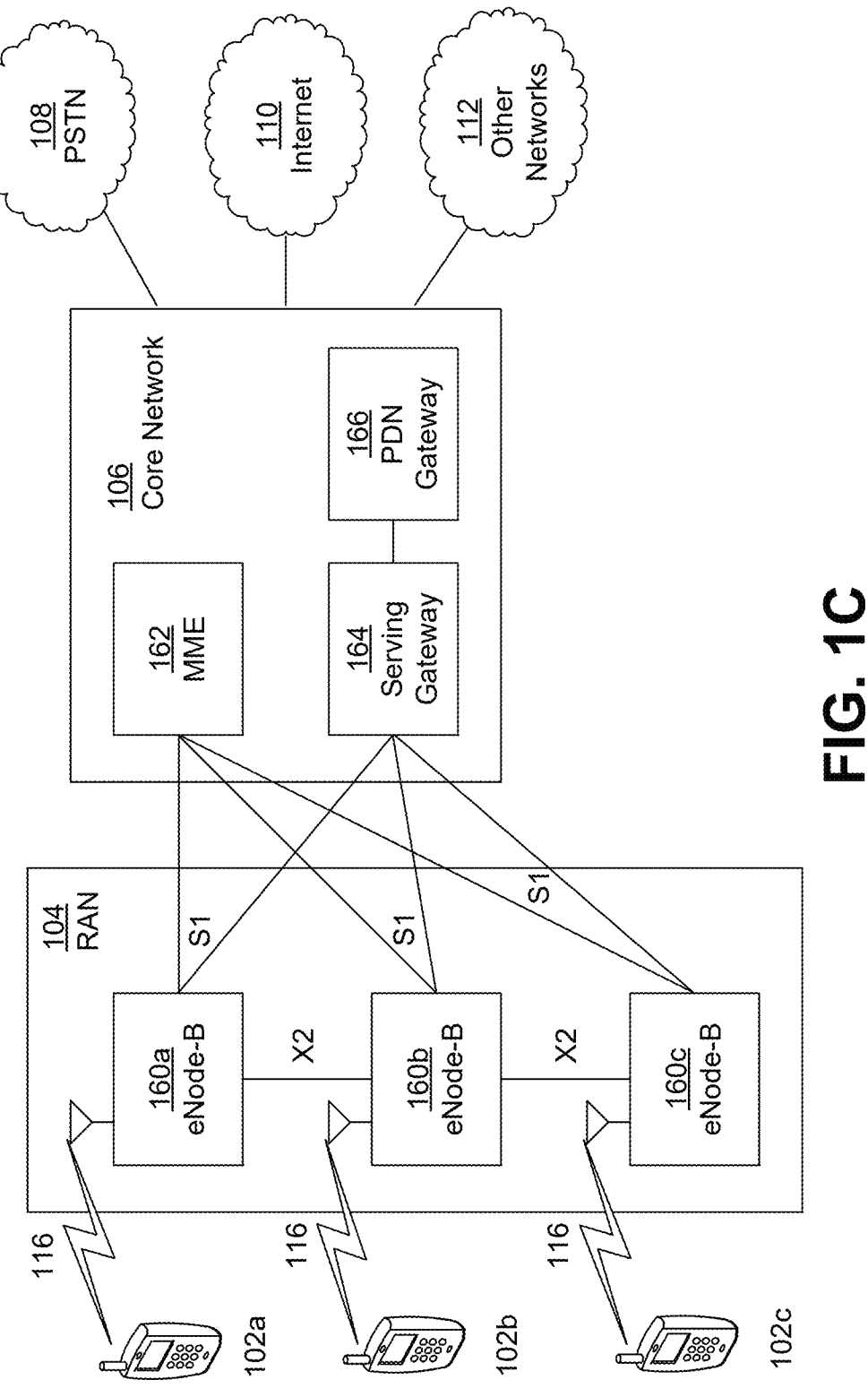
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
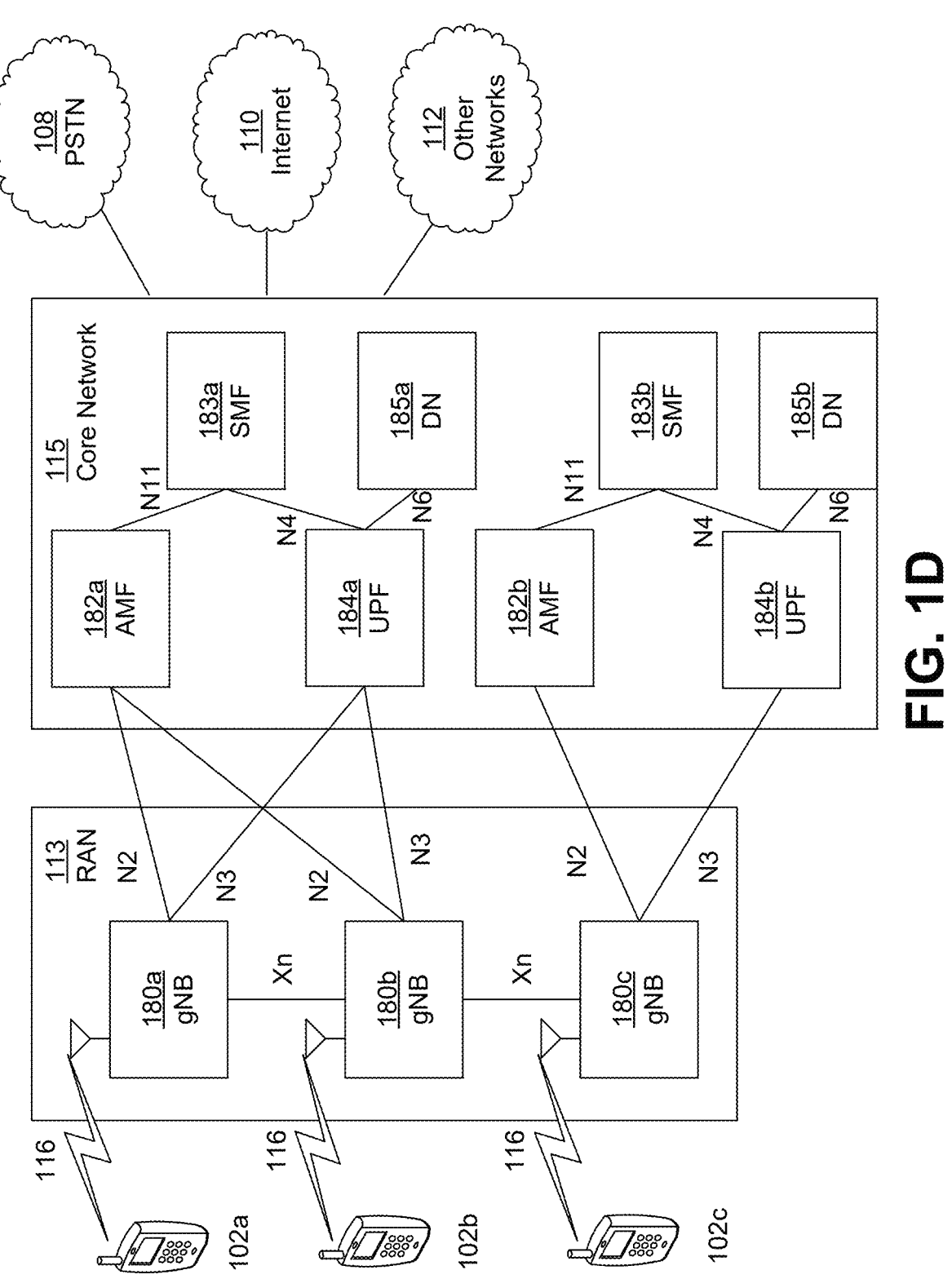
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
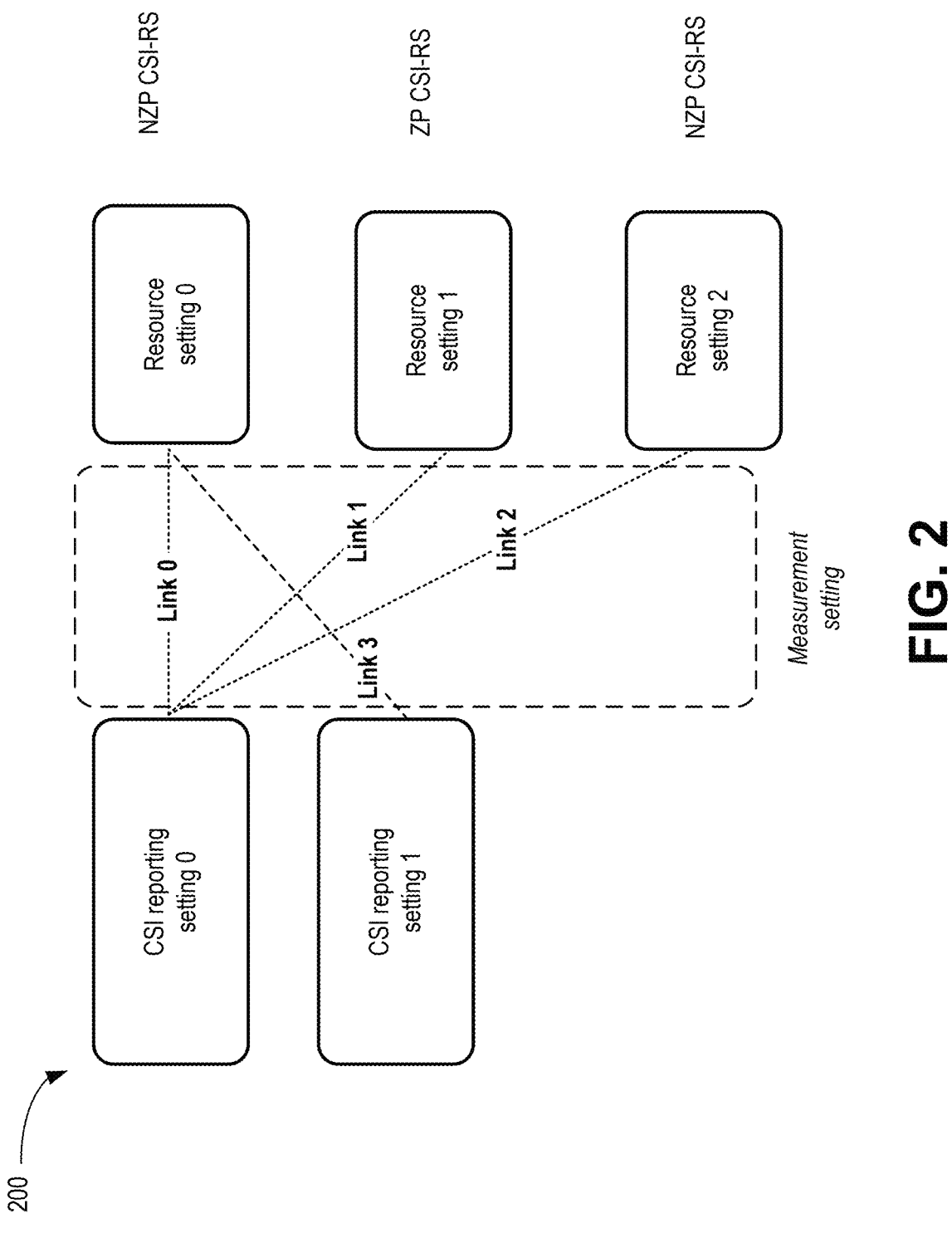
FIG. 2 illustrates an example of configuration information for channel state information (CSI) measurement, reporting, link, and resource settings.

FIG. 2 is a diagram 200 showing example configuration information for channel state information (CSI) measurement, reporting, link, and resource settings.

In the context of Channel State Information (CSI) reporting, Channel State Information may include one or more of a channel quality index (CQ), a rank indicator (RI), a precoding matrix index (PMI), L1 channel measurements such as Reference Signal Received Power (RSRP) and/or Signal-to-Interference-plus-Noise Ratio (SINR), a CSI-RS resource indicator (CRI), a Synchronization Signal/Physical Broadcast Channel (SS/PBCH) block resource indicator (SSBRI), a layer indicator (LI), and/or any other measurement quantity determined by the WTRU from the configured reference signals (e.g., CSI-RS, SS/PBCH block, and/or any other applicable reference signal).

Regarding the CSI reporting framework, a WTRU may be configured to determine and report CSI through the uplink control channel on the Physical Uplink Control Channel (PUCCH) and/or per the gNB's request via an uplink (UL) Physical Uplink Shared Channel (PUSCH) grant. Depending on the configuration, CSI-RS may cover the full bandwidth of a Bandwidth Part (BWP) and/or a portion of it.

Within the CSI-RS bandwidth, CSI-RS may be configured on every Physical Resource Block (PRB) and/or every other PRB. In the time domain, CSI-RS resources may be configured as periodic, semi-persistent, and/or aperiodic. Semi-persistent CSI-RS may operate similarly to periodic CSI-RS, except that the resource may be deactivated and/or reactivated by Medium Access Control (MAC) Control Elements (CEs), with the WTRU determining and reporting the relevant measurements when the resource is activated.

Aperiodic CSI-RS may be triggered by the gNB to prompt the WTRU to determine and report measured CSI-RS on the PUSCH by request in Downlink Control Information (DCI). Periodic reports may be transmitted on PUCCH, while semi-persistent reports may be transmitted on PUCCH and/or PUSCH. The reported CSI may be utilized by the scheduler for one or more of allocating optimal resource blocks based on the channel's time-frequency selectivity, determining precoding matrices, beams, transmission modes, and/or selecting suitable Modulation and Coding Schemes (MCSs). The reliability, accuracy, and/or timeliness of WTRU CSI reports may be particularly important for meeting the requirements of Ultra-Reliable Low Latency Communications (URLLC).

A WTRU may be configured with a CSI measurement setting, which may include one or more of CSI reporting settings (e.g., N≥1 CSI reporting settings), resource settings (e.g., M 1 resource settings), and/or a link between one or more CSI reporting settings and one or more resource settings (e.g., a CSI measurement setting linking N CSI reporting settings with M resource settings). In some examples, a CSI measurement setting may include one or more CSI reporting settings, one or more resource settings, and/or a combination of the two. For instance, a CSI reporting setting may include time-domain behavior, such as aperiodic, periodic, and/or semi-persistent reporting. Additionally, the CSI reporting setting may define frequency granularity, at least for PMI and CQI, and specify the CSI reporting type, such as PMI, CQI, RI, CRI, and/or other types. If a PMI is reported, the setting may indicate the PMI type (Type I and/or Type II) as well as the codebook configuration. In a resource setting, time-domain behavior (e.g., aperiodic, periodic, and/or semi-persistent) may be defined, along with the reference signal type (e.g., for channel measurement and/or interference measurement). The resource setting may include one or more resource sets, each of which may contain a number of resources (e.g., Ks resources). A CSI measurement setting may also include a reference transmission scheme setting, particularly for CQI reporting. For CSI reporting for a component carrier, one or more of a variety of frequency granularities may be supported, including wideband CSI, partial-band CSI, and/or sub-band CSI.

In some examples, artificial intelligence (AI) may be broadly defined as machine behavior that may mimic cognitive functions, including sensing, reasoning, adapting, and/or acting. The terms AI, Machine Learning (ML), Deep Learning (DL), and Deep Neural Networks (DNNs) may be used interchangeably in this context. The methods described herein may exemplify AI in wireless communication systems but may not be limited to these systems. Such methods may apply to any type of transmission, communication system, and/or service.

Autoencoders (AEs) may be a specific class of deep neural networks (DNNs) used in unsupervised machine learning. In this context, high-dimensional data may be non-linearly transformed into a lower-dimensional latent vector using a DNN-based encoder. The lower-dimensional latent vector may then be used to reproduce the high-dimensional data using a non-linear decoder. The encoder may be represented as $E(x; W_e)$ where x represents the high-dimensional data and $W_e$ represents the parameters of the encoder. The decoder may be represented as $D(z; W_d)$ where z represents the low-dimensional latent representation and $W_d$ represents the parameters of the decoder. The auto-encoder may be trained using training data (e.g., $\{x_1, \ldots, x_N\}$) by solving the following optimization problem:

$$\{W_e^{tr}, W_d^{tr}\} = \arg\min_{W_e, W_d} \sum_{i=1}^{N} \|x_i - D(E(x_i; W_e); W_d)\|_2^2,$$

where $$W_e^{tr}$$

represents trained weights of the encoder and $$W_d^{tr}$$

represents trained weights of the decoder. The above optimization problem may be approximately solved using a backpropagation algorithm. The trained encoder $$E(x; W_e^{tr})$$

may be used to compress the high-dimensional data, and the trained decoder $$D(z; W_d^{tr})$$

may be used to decompress the latent representation.

Existing methods for training two-sided models, such as autoencoders, may either require that both the encoder and decoder be present at the same computing entity during training or involve significant data transfer to accomplish the training. A first set of methods that rely on training at the same compute entity may be restrictive as the two-sided models (e.g., encoders and decoders) may be deployed at two different entities (e.g., WTRU and gNB, respectively). Thus, ensuring that the model is available for training at a single entity results in disclosing the proprietary model details (e.g., architecture and/or type of layers) of either the WTRU or gNB. In a second set of training methods, the two models may be hosted at their respective entities, and a comparatively large amount of data transfer may be required for the gradient flow at each training step and/or for sharing the raw and encoded data pairs. Such large quantities of data transfer may be prohibitive for the training process, which may render the training process impractical. This training method also may include a restriction that the training is done sequentially (e.g., first at the gNB and then at the WTRU or vice versa) which may not be easily extendible to a multi-vendor setting.

In some examples, a method for training two-sided models (e.g., for CSI compression) may be considered where the WTRU trains the WTRU-side model and the network trains the network-side model independently to satisfy topology, geometry, and/or structure-related criteria. The WTRU and network may achieve interoperability for inference by ensuring that, in the compressed or latent space, the two entities maintain the same topology or structure of the training data points as in the input data space. The same idea of topology may be utilized for the training of models at the two entities. The training may be performed serially and/or sequentially to ensure that the topology, after mapping in the latent or compressed space of one entity, is preserved at the other entity. Additionally, or alternatively, the two entities may train their respective models without coordination while ensuring that the data topology in both latent spaces satisfies predefined conditions and/or metrics.

In an example, a WTRU may be configured with a single metric or method $M_i$, such as [M1](e.g., a method with index 1), or a set of methods, such as [M1, M2, . . . MN], to evaluate the data topology and/or structure for WTRU-side model training. For example, $M_i$ may represent the i-th method (e.g., the method with an I-th index) in a set of methods (e.g., multiple methods). $M_i$ may represent method M1 by default when configured with a single metric or method. One or more of the methods may identify the algebraic topology using simplicial complexes, with the WTRU being configured with the degree of the simplicial complex (e.g., a 0-degree complex may represent unconnected points, a 1-degree complex may represent an undirected graph, a 2-degree complex may represent triangles, etc.). One or more of the methods may extract features representing the topology, such as by utilizing persistent homology to extract the number of holes, information about holes, barcodes, persistence diagrams, persistence pairings, and/or similar features. One or more methods may measure data topology through the Hodge Laplacian (e.g., a graph Laplacian operator) by taking the eigen decomposition of the Laplacian matrix.

Each method Mi may be accompanied by a logical identification, a mapping $f_i(.)$ to map the input data before evaluating connectivity, a distance measure or metric to identify connected components, a weighting factor $\lambda_i$, a degree for the construction of the simplicial complex, and/or a loss function $L_i$ for regularization. Additionally, each method $M_i$ may be further associated with a subset of the dataset, such that the method $M_i$ may be utilized for training only with samples corresponding to the subset $A_i \subset A$, where A represents the complete dataset.

A performance metric or requirement may be defined for each topology-related method and/or metric $M_i$. This may include a metric for the performance of each metric or method $M_1$, such as normalized mean squared error (NMSE), Squared Generalized Cosine Similarity) SGCS, classification accuracy, and/or similar metrics. A key performance indicator (KPI) may include a minimum performance threshold for each metric associated with one or more of the metrics or methods $M_i$.

Further parameters may include encoder-decoder-related parameters, such as latent dimension, a loss function for auto-encoding, and/or performance metrics or requirements for topology-based methods. For example, a metric for the performance of the autoencoder (e.g., NMSE and/or SGCS) and/or a KPI including a minimum performance threshold for each metric may be defined.

The WTRU may transmit an indication related to compatibility and/or interoperability information for model identification between the WTRU-side model and the network-side model. This indication may include the identity of the metric or method $M_i$ utilized for topological compatibility testing, the identity of the test data used for compatibility testing, the topology or connectivity of the test dataset in the latent space, the topological features of the test dataset in the latent space, and/or the value of topological loss between the data in the input space and the latent space.

The WTRU may conduct performance monitoring based on the topology of the input space and/or the latent space. The WTRU may measure the topology of the input space and the latent space for a set of samples observed over a preconfigured period of time. When the topology or features associated with the topology in the two spaces are determined to be mismatched (e.g., when a topological loss between the input space and the latent space is above a predefined threshold), the WTRU may report an out-of-distribution event to the network. Additionally, or alternatively when the topology and/or associated topological features of the latent samples differ from the decompressed samples, the network-side model may be expected to perform poorly.

In an example of model training, the WTRU may train its artificial intelligence and machine learning (AIML) model based on topology-based regularization. The WTRU may train its encoder model to enforce the same topology observed in the input data space in its latent space. For each method Mi, the WTRU may map data into the latent space, measure the topology-related features, and minimize the corresponding loss function. Additionally, or alternatively, the WTRU may utilize a pre-defined topology and/or topological features, (e.g., as defined by the network and/or relevant standards), and enforce the topology of the datasets in the latent space to match the pre-defined topology.

In some examples, a method for checking the interoperability of a two-sided model (e.g., for CSI compression) may be considered. In this context, the WTRU may train the WTRU-side model, and the network may train the network-side model independently. Statistics associated with the latent space of the WTRU-side model and those of the network-side model may be compared to verify interoperability. Further, the same idea of statistics may be utilized for training models at both entities. Training may be performed serially and/or sequentially to ensure that the data statistics, post mapping in the latent or compressed space of one entity, are preserved at the other entity. Additionally, or alternatively, both entities may train their respective models without coordination, while ensuring that the data statistics in both of their respective latent spaces satisfy predefined statistics.

In an example, a WTRU may be configured with a plurality of testing datasets, each of which may be associated with one or more deployments, vendors, additional conditions, metrics, and/or statistics. Each dataset may be associated with a Dataset ID and/or one or more applicable conditions. The dataset may be configured as a distribution of parameters, which may be expressed in terms of fundamental channel parameters (e.g., decomposed channels) or in terms of 3GPP channel model parameters (e.g., UMa, CDL, Doppler, and/or delay).

The WTRU may evaluate and/or enforce one or more statistics or statistical parameters in the latent space during WTRU-side model training. These statistics may include, for example, first-order statistics (e.g., data mean), second-order statistics (e.g., data variance, correlation matrix, and/or covariance matrices), higher-order statistics, eigenvectors and/or eigenvalues. For example, the number of eigenvalues and eigenvectors used may be limited (e.g., the top three eigenvalues and/or eigenvectors).

Each statistic may be associated with a weighting factor $\lambda_i$. Each statistics-based interoperability may be associated with a specific and/or minimum batch size to ensure the statistics are computed meaningfully. For example, fewer samples may be required for calculating the mean, but calculating higher-order (e.g., $N^{th}$-order) moments may require more samples. A loss function $L_1$ may be associated with each statistic, such as an L2 loss between the mean of the encoded data and the desired mean $$\left| \frac{1}{N} \sum_{i=1:N} E(H_i) - M_i \right|_2^2,$$

where mean of the encoded data is given as $$\frac{1}{N} \sum_{i=1:N} E(H_i)$$

with E(.) representing the encoder model, and $M_i$ represents the desired or pre-specified mean. Another example of the loss function $L_i$ may be an L2 loss between the correlation matrix of the encoded data, $\Sigma E(H_i)^T E(H_i)$ and the desired/specified correlation matrix, $C_{EE}$ as the $$\left| \sum E(H_i)^T E(H_i) - C_{EE} \right|_2^2,$$

or SGCS loss between the eigenvectors of the covariance matrix of the encoded data $V_{HH}$ and the desired/specified eigenvectors $V_D$ SGCS ($V_{HH}, V_D$).

Performance thresholds (e.g., minimum performance thresholds) may be defined for each statistic. For example, the gap between data mean may be less than a particular threshold (e.g., less than 0.05), and/or the top three eigenvectors may have a cosine similarity equal to or greater than a particular threshold (e.g., 0.95 or more). The model may also be configured with model-related parameters such as latent dimensions and a loss function for auto-encoding. Performance metrics and/or requirements may include, for example, metrics for performance of the autoencoder (e.g., NMSE, SGCS, and/or KPI, where the KPI may be a minimum performance threshold for each metric.

The WTRU may conduct performance monitoring based on statistics associated with the latent space. For example, the WTRU may measure one or more statistics, such as mean, covariance, and/or eigenvectors, over samples observed during a preconfigured period in the compressed latent space. Additionally, or alternatively, the WTRU may measure the energy conserved by principal components (PCs) of the training data. The measured statistics may be compared to a reference statistic, which may be either network-configured or WTRU-determined based on training data similarity. If the measured statistic differs from the reference by a threshold, the WTRU may report an out-of-distribution event to the network.

In an example of model training, the WTRU may be configured with one or more desired latent space statistics to train its AIML encoder model based on statistics-based regularization. During statistics-aware training, the WTRU may be configured with one or more desired latent space statistics and corresponding loss functions to train the encoder model. At each update step, the WTRU may compute the data corresponding to the entire batch in the latent space, evaluate the specified statistics, and/or update the model weights to minimize the autoencoder loss and/or the loss associated with each of the predefined data statistics. The WTRU may continue training until a stopping criterion for data statistics and/or reconstruction loss are met. After training its encoder model, the WTRU may determine the statistics of the latent space and/or enforce desired statistical properties for the latent space.

The WTRU may transmit an indication related to compatibility and/or interoperability information for model identification between the WTRU-side model and the network-side model. If sequential training (with the WTRU training first) is performed, the WTRU may compute the data statistics in the latent space and report them to the network. The WTRU may report first-order statistics (e.g., data mean), second-order statistics, higher-order statistics, and/or eigenvectors and eigenvalues (e.g., the top three eigenvectors and values).

For a reporting instance (e.g., CSI feedback), the WTRU may derive encoded input $H_i$ (e.g., channel matrix) in latent space ($E(H_i)$), apply preconfigured quantization to the encoded representation $E(H_i)$, and/or report the quantized representation as compressed.

The WTRU may be configured with an AIML encoder to be used for CSI generation, where the configured encoder may satisfy one or more interoperability conditions and/or parameters. This may ensure proper operation and/or pairing between the WTRU AIML encoder model and the NW AIML decoder model, while limiting the sharing of information about the models at both communication nodes. For example, the conditions and/or parameters may include the bottleneck dimension size, quantization type, number of quantization bits, and/or the input data type (e.g., CSI or a preprocessed version of the input data).

The WTRU encoder model may be explicitly configured (e.g., using a model ID), where each model may be defined by one or more parameters, such as bottleneck size, quantization, and/or input data type. Alternatively, or additionally, the WTRU encoder model may be implicitly configured (e.g., using functionality) as a function of the allocated uplink CSI payload, channel conditions, number of configured MIMO layers, number of transmit and/or receive antennas, configured BWP, and/or any other applicable configurations. It is noted that while CSI compression is used herein as an example, the systems and/or methods described herein are not limited to CSI compression and should be broadly considered applicable to any use case in which a two-sided model framework is used, with separate training of the encoder and decoder models and/or with limited sharing of information about the encoder and/or decoder models (e.g., architecture and/or training procedures) at the two nodes.

The WTRU may be configured with a plurality of datasets to support AIML encoder model training while ensuring interoperability with a separately trained AIML decoder model. Each dataset may be associated with one or more parameters and/or configuration information. A dataset may have an index or ID, where the dataset ID may identify a pre-existing dataset along with one or more associated parameters, such as a defined format and/or CSI type. For example, the CSI type may include full CSI, eigenvector-domain samples, beam-domain samples, and/or delay-domain samples. The dataset may also be associated with dataset applicable conditions. The dataset applicable conditions may include a set of possible CSI measurement ranges for which the dataset is generated. The measurement types may include one or more of Reference Signal Received Power (RSRP), Reference Signal Received Quality (RSRQ) Signal-to-Noise Ratio (SNR), Received Signal Strength Indicator (RSSI), Rank Indicator (RI), delay spread, Doppler shift, Angle of Arrival (AoA) range, and/or Angle of Departure (AoD) Range.

Dataset configuration parameters may include, for example, one or more of configuration parameters (e.g., a number of transmit and/or receive antenna ports, a Bandwidth Part (BWP), a frequency region, and/or a number of beams in the case of beam-domain samples. In the case of delay-domain samples, the number of delay taps may be included. The dataset configuration may include at least one of a scenario (e.g., link type such as Line of Sight (LOS) and/or Non-Line of Sight (NLOS), indoor and/or outdoor, moving and/or non-moving WTRU and/or associated speed, cell edge users and/or call center users). The dataset may also include one or more functions (e.g., preprocessing and/or post-processing, transformation applied to the data. The dataset may include channel model parameters (e.g., UMa, UMi, ray tracing, and/or field data).

The WTRU may also be configured with a performance metric and/or requirement associated with each dataset. For example, the metric may be configured as cosine similarity and/or variations thereof. Alternatively, the metric may be the NMSE and/or the Euclidean distance. The metric may be a projection of encoded test samples on the encoded anchor vectors and may include a comparison of the resulting projection with a configured threshold. The WTRU may determine measurements for a configured metric between the encoded anchor vectors and one or more test samples from the dataset, where the encoded test one or more test samples and the encoded anchor vectors may be different.

A WTRU may be configured with one or more topology-related methods (e.g., N methods, (e.g., M1, M2, . . . MN), which may be used for compatibility testing and/or model training on the WTRU side. The one or more topology-related methods $M_i$ may be utilized and/or enforced during encoder training to ensure interoperability with a separately trained AIML decoder model using the same method $M_i$. Each method $M_i$ may be associated with a methodology to evaluate the connectivity and/or topology in a given set of data points. For example, a method $M_i$ may be utilized to identify algebraic topology using simplicial complexes, where the WTRU may be configured with a degree of simplicial complex (e.g., a0-degree complex for unconnected points, a 1-degree complex for an undirected graph, and/or a 2-degree complex for triangles).

Each method $M_i$ may be associated with a methodology to extract features related to or representing the topology or connectivity of the data points. For example, persistent homology may be used to extract the number of holes, information about the holes, bar codes, persistence diagrams, and/or persistence pairings. In an example, data topology may be measured through Hodge Laplacian (e.g., graph Laplacian operator), by taking the eigen decomposition of the Laplacian matrix.

The method $M_i$ may be associated with one or more of the following configurations. The method $M_i$ may be associated with a method Index and/or Method ID, which may identify a specific method $M_i$ associated with a particular use case. The method $M_i$ may be associated with a subset of the dataset, where the method $M_i$ may be used for training, performance measurement, and/or compatibility testing with samples corresponding to the subset $A_i \subset A$, where A is the complete dataset. The method $M_i$ may be associated with a mapping $f_i(.)$ to map the input data before evaluating the connectivity. The method $M_i$ may be associated with a distance measure and/or metric to identify connected components. The method $M_i$ may be associated with a degree for constructing the simplicial complex. The method $M_i$ may be associated with a weighting factor $\lambda_i$. The method $M_i$ may be associated with a loss function $L_i$, which may be used for regularization and/or performance measurement.

The WTRU may be configured with a performance metric and/or requirement associated with each topological method $M_i$. For example, the performance metric and/or requirement may be configured as cosine similarity or variations thereof. The performance metric and/or requirement may be a NMSE and/or a classification accuracy. The WTRU may be configured with a performance threshold for each metric associated with each method $M_1$, where the performance threshold may be utilized to evaluate topological method performance. The topological method performance may represent an implicit measure of the latent space alignment and compatibility between the WTRU-side encoder and the NW-side decoder. If the measured performance metric and/or performance satisfies the threshold condition, this may indicate that the topological method $M_i$ is valid for ensuring interoperability between the WTRU-side encoder and the NW-side decoder. The WTRU may be configured to report the performance metric and/or requirement associated with the topological method $M_i$, where the indicated value may be Boolean (e.g., below or above the threshold) and/or presented in absolute format.

In some examples, the WTRU may be configured to use statistics-based interoperability to enable interoperability between the WTRU-side encoder and the NW-side decoder. The statistics-based interoperability may require the WTRU to evaluate one or more statistics or statistical parameters during model training. For example, the statistics may include first-order statistics such as the data mean, second-order statistics such as data variance, correlation matrix, and/or covariance matrix, higher-order statistics, and/or eigenvectors and/or eigenvalues (e.g., a number of given eigenvalues and/or eigenvectors to be used).

In some examples, a weighting factor A, may be associated with each of the statistics. Each statistics-based interoperability configuration may be associated with a specific and/or minimum batch size to ensure that the statistics are computed meaningfully. For example, when calculating the mean, a set of K1 samples may be needed. For calculating $N^{th}$-order moments K2>K1 samples may be utilized.

For the purposes of training and/or determining statistics, the WTRU may be configured with a plurality of datasets. Each dataset may be associated with one or more elements, such as deployments, vendors, WTRU/NW conditions, metrics, and/or statistics. For example, each dataset may be linked to a dataset ID, and/or each dataset may be associated with one or more applicable conditions. In another example, each dataset may be configured as a distribution of parameters, such as fundamental channel parameters (e.g., decomposed channels), expressed in terms of 3GPP channel model parameters, such as UMa, CDL, Doppler, delay, and/or other related factors.

Additionally, or alternatively, the statistics may include processed versions of the aforementioned statistics. For example, the statistics may involve eigen-decomposition, including eigenvectors and/or eigenvalues of the second-order statistics of latent space samples, where the number of the latent space samples may be configured. In some examples, the statistics-based interoperability may be associated with a regularization factor and/or a specific and/or minimum batch size to ensure meaningful statistics are determined. Without a sufficient number of samples, the performance may be impacted due to the lack of a sufficient number of samples used to compute the statistics. The number of samples may be represented as a function of the adopted statistics (e.g., N=f(p)), where p is the configured statistics order and f(.) is a predefined function at the WTRU and/or the NW. The function f(.) may represent a direct relationship between N and p, wherein the number of samples needed increases as the statistics order increases.

Each statistics-based interoperability configuration may also be associated with a loss function (e.g., $L_P$), where p is the statistics order. For p=1, the loss function $L_1$ may represent the NMSE between the actual data mean and the desired data mean as follows:

$$L_1 = \left| \sum E(H_i) - M \right|_2^2,$$

where M is the desired data mean. For p=2, the loss function $L_2$ may represent the NMSE between the actual data correlation matrix and the desired correlation matrix as follows:

$$L_2 = \left| \sum E(H_i)^T E(H_i) - C_{EE} \right|_2^2,$$

where $C_{EE}$ represents the desired correlation matrix. For eigenvalue (EV)-based statistics, the loss function may represent the negative of the squared generalized cosine similarity (SGCS) between the output of the encoder and/or decoder and a set of candidate eigenvectors computed in the latent space, either at the WTRU side or the NW side.

The WTRU may be configured to determine and/or report the performance of statistics-based interoperability. For example, the WTRU may be configured with a minimum performance threshold to determine the quality of alignment between the WTRU-side latent space and the NW-side latent space. The performance threshold may define the maximum allowable gap between the desired data mean and the latent space training samples mean. For example, a minimum performance threshold for each gap between the data mean may be less than 0.05, and/or the top three eigenvectors may have a cosine similarity of 0.95 or more.

Additionally, or alternatively, the WTRU may be configured with model-related parameters, such as the latent dimension, input dimension, loss function, and/or other relevant parameters.

In examples, the WTRU may first leverage algebraic topology tools to estimate or approximate the structural information of the underlying data manifold. The WTRU may construct a simplicial complex (e.g., Vietoris-Rips complex), using a predefined distance metric or similarity metric (e.g., L2 distance and/or cosine similarity). The WTRU may first determine the pairwise distances between samples in the input dataset DS using the predefined metric. Given these distances, a maximum predefined scale (e.g., radial distance around each data point) and/or a predefined dimension for constructing the complex, the WTRU may construct the Vietoris-Rips complex.

The WTRU may consider a dimension of d=0, which may correspond to the minimum spanning tree. During the training process, the WTRU may construct the minimum spanning tree for a given batch of data, mapping the data points both in the input data space and in the compressed or latent data space. In the graph associated with the minimum spanning tree, the WTRU may consider $P_X$ as the pair of points in the input data space with an edge between the points and $P_Z$ as the same pair of points mapped in the latent space.

The distances DXX may be determined based on the distance between a pair of connected nodes in the input data space using the graph from the input data space. $D_{ZZ}$ may be determined as the distance between a pair of connected nodes in the latent space using the graph constructed in the latent space. $D_{ZX}$ may be determined as the distance between pair of connected nodes in the latent space using the graph constructed in the input data space. $D_{XZ}$ may be determined as the distance between a pair of connected nodes in the input data space using the graph from the latent space. The loss may be determined by:

$$L_{topo} = \frac{1}{2} \|D_{XX} - D_{ZX}\|^2 + \frac{1}{2} \|D_{XZ} - D_{ZZ}\|^2.$$

where $L_{topo}$ represents the topological loss. The overall loss may be determined by:

$$L = \frac{1}{N1} \sum_{i=1:N1} |D_1(E_1(H_i)) - H_i|_F^2 + \lambda L_{topo}$$

The topology of the data may be measured through the eigenvectors of the Hodge-Laplacian operator. Given a simplicial complex associated with the input data points, the WTRU may compute the Hodge-Laplacian (graph Laplacian) operator, which provides information about the topology of the simplicial complex. One key property of the Hodge-Laplacian is that its spectral decomposition provides insight into the topology of the simplicial complex. Topological information may be retrieved by computing the eigen decomposition of the Hodge-Laplacian operator and retaining the top-K eigenvectors. The WTRU may compute the eigenvectors of the Hodge-Laplacian operator. For example, given the n-th Hodge-Laplacian (e.g., associated to the n-dimensional simplicial), the WTRU may determine the associated eigenvectors $$\{e_1^n, e_2^n, \ldots, e_k^n\}.$$

Then, the spectral embedding for a subset of samples may be determined and/or minimized with respect to the latent representation. This process may be performed for all the simplices from 0 up to n as follows:

$$L_{H-L} = \sum_{i=0,\ldots,n} \sum_{d \in D_{subset}} \left\| e_j^i - E_1(H_d) \right\|^2,$$

where, $L_{H-L}$ represents the loss associated with the Hodge Laplacian operator.

In an example, the WTRU may first form a graph associated with the input data points $G_1$ and another graph associated with the same data points in the latent space (e.g., post mapping through the encoder), $G_2$. The WTRU may train and/or update its encoder-decoder to minimize the reconstruction error and to align the graphs $G_1$ and $G_2$ directly using a graph alignment-based metric and/or loss, and/or to minimize a predefined distance metric between the two graphs $G_1$ and $G_2$. In one example, a graph alignment or graph distance may be evaluated as follows:

$$L_{alignment} = Tr(L_1^+ + L_2^+) - 2Tr\left(\sqrt{L_1^{+\frac{1}{2}} L_2^+ L_1^{+\frac{1}{2}}}\right),$$

where $L_1$, $L_2$ are the graph Laplacian matrices associated with graphs $G_1$ and $G_2$. The matrices $$L_1^+, L_2^+$$

are the respective pseudo inverse matrices of the graph Laplacian. $G_1$ and $G_2$ may be associated with the latent spaces of the NW and WTRU respectively. The WTRU may then train its model to align the graph $G_2$ with $G_1$.

More generally, the WTRU may train the AIML model using regularization based at least in part on topological features or metrics. The WTRU may train the encoder to ensure that the topology of the latent space matches the topology observed in the input data. For each topology metric or method $M_1$, the WTRU may map the data into the latent space, measure the topology-related features, and/or minimize the corresponding loss function. These topology metrics and features may be predefined in the standards and/or configured by the network. The WTRU may use a predefined topology and/or topological features (e.g., defined by either the network and/or the standards), and may enforce the topology of the latent space to match the predefined topology.

Additionally, or alternatively, post-training transformations may be utilized to ensure interoperability between the WTRU-side and NW-side models. To ensure compatibility between the WTRU-side model (e.g., an encoder) and the NW-side model (e.g., a decoder), a transformation function T(.) may be identified and/or trained based on a subset of data points from the training data and/or on a separate set of data points. This transformation T(.) may be linear and/or non-linear. The transformation T(.) may be applied to the encoder output before it is fed to the decoder output. The transformation may be hosted and/or applied at the WTRU side before transmission and/or at the NW side post receiving information from the WTRU side.

One or more methods herein are described in terms of encoder/decoder of an autoencoder architecture as examples, but it is to be appreciated that the methods described herein are more generally applicable to any type of AIML model architecture. Herein the term encoder, decoder may be used interchangeably with AIML model. One or more methods herein are described in terms of gNB/NW, but it is to be appreciated that the methods described herein are more generally applicable to any type of transmission/reception node (e.g., WTRU).

Figure 3:
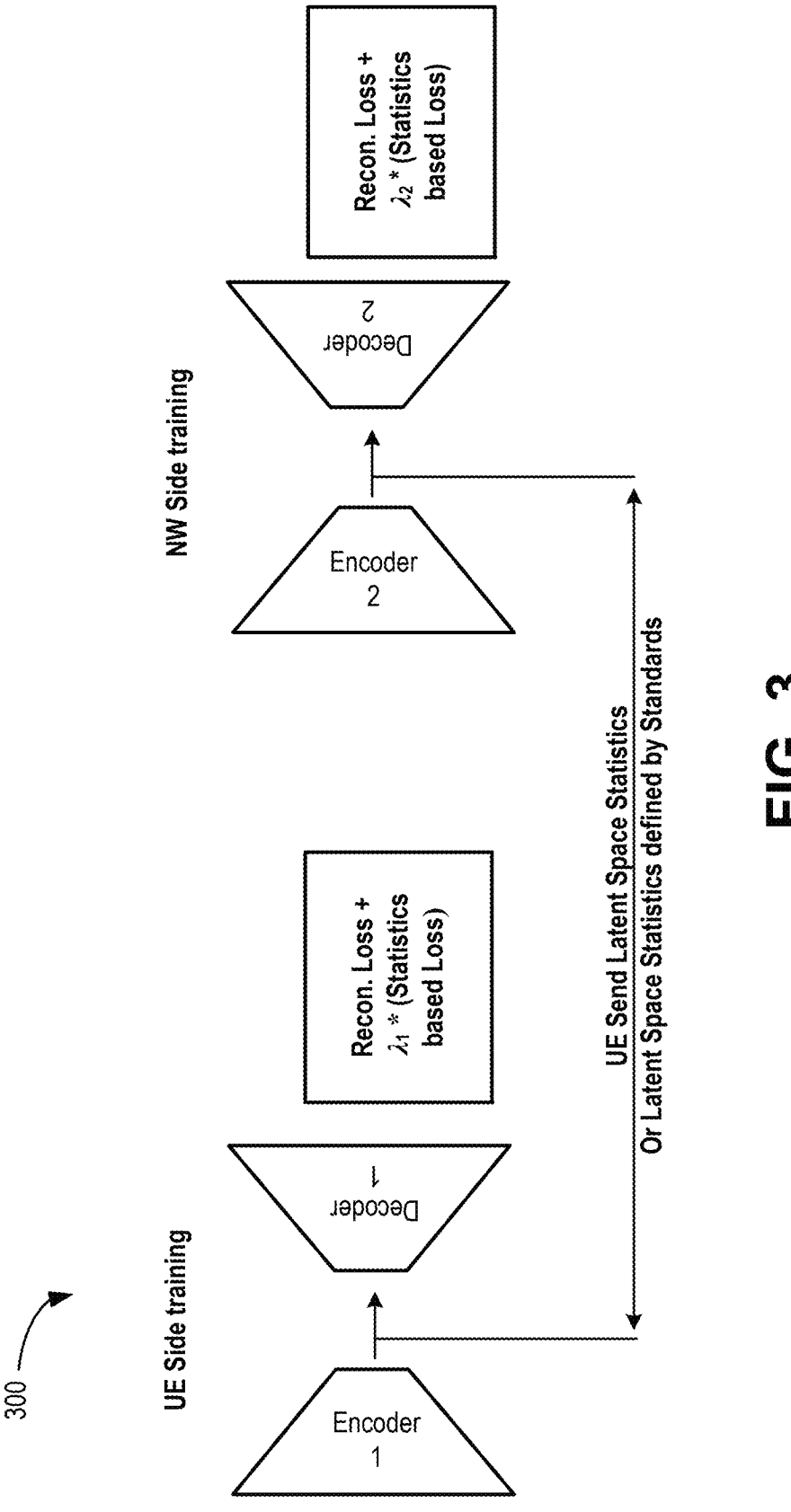
FIG. 3 is an example of procedures for training respective WTRU and network-side encoder-decoder models for interoperability using reconstruction loss and statistics-based loss.

FIG. 3 shows an example procedure 300 for training respective WTRU and network-side encoder-decoder models for interoperability using reconstruction loss and statistics-based loss.

In examples, the WTRU and/or the NW may train their respective encoder-decoder models using a combination of reconstruction loss and statistics-based loss to ensure interoperability. The shared statistics-based loss aligns the WTRU-side and NW-side models.

The WTRU may perform the training of its model using statistics-based and/or topological regularization to ensure compatibility with the NW-side model. The WTRU may utilize one or more predefined data statistics from the latent space $[S_1, \ldots, S_j, \ldots S_N]$ to train the WTRU side model to be interoperable with the NW side model. By aligning the statistics between the WTRU side latent space and the NW side latent space, the WTRU side encoder may be made compatible with the decoder side model. The WTRU may train an encoder model $E_1$ along with a decoder model $D_1$ to minimize the reconstruction loss and additionally regularize the training with the predefined statistics. In one example, the WTRU may utilize the first order statistics such as the desired and/or predefined mean of the samples in the latent space, $M_1$, for training. The overall loss function can be determined as follows:

$$\frac{1}{N1} \sum_{i=1:N1} |D_1(E_1(H_i)) - H_i|_F^2 + \lambda_j \left|\frac{1}{N_1}\left(\sum_{i=1:N1} E(H_i)\right) - M_1\right|_2^2$$

where, the first term in the loss function deals with the reconstruction error and the second term is associated with minimizing the error between the mean of the samples in the latent space and the desired/predefined mean, $M_1$. The WTRU may regularize the loss function using second-order statistics, such as the covariance and/or correlation matrix of samples in the latent space. This regularization may be used to align the WTRU-side latent space. For example, when the desired and/or predefined correlation matrix for data samples in the latent space of the WTRU-side encoder is given by $C_{EE_1}$, the WTRU side model training may then utilize the following loss term:

$$\frac{1}{N1} \sum_{i=1:N1} |D_1(E_1(H_i)) - H_i|_F^2 + \lambda_2 \left|\frac{1}{B_j}\left(\sum_{i=1:B_j} E(H_i)^T E(H_i)\right) - C_{EE_1}\right|_F^2.$$

The WTRU may combine multiple statistics-related losses during training, with each loss being associated with a scaling or weighting factor. For example, a first loss function associated with aligning the mean of the samples in the encoder's latent space with a desired and/or predefined mean $M_1$, may be utilized and be weighted with a weight A. A second loss function associated with aligning the correlation and/or covariance matrix of the data samples in the encoder's latent space with a desired and/or predefined correlation and/or covariance matrix may be utilized and may be weighted with a weight $A_2$. These loss terms maybe utilized in addition to other loss terms associated with minimizing the reconstruction error. Thus, the overall loss function maybe expressed as:

$$Loss = \frac{1}{N1} \sum_{i=1:N1} |D_1(E_1(H_i)) - H_i|_F^2 + \lambda_1 \left|\frac{1}{N_1}\left(\sum_{i=1:N1} E(H_i)\right) - M_1\right|_2^2$$

$$+ \lambda_2 \left|\frac{1}{B_j}\left(\sum_{i=1:B_j} E(H_i)^T E(H_i)\right) - C_{EE_1}\right|_F^2.$$

The WTRU may align the eigenvectors and/or eigenvalues of the latent space with a set of predefined eigenvectors or values, and/or align the principal components of the latent space with predefined principal components. For example, given the principal components $[P_1, \ldots P_N], [V_1, \ldots V_N]$, where, $P_i$, $V_i$ are the i-th principal eigenvector and eigenvalue, to align these with the pre-defined values, the following loss function may be utilized:

$$\sum_{i=1:N1} |H_i - D_1(E_1(H_i))|_F^2 + \lambda \sum_{i=1:N1} E_1(H_i)^T [P_1, \dots P_N] - [V_1, \dots, V_N]$$

To compute the loss associated with each task, the WTRU may use a different batch size $B_j$ for each of the tasks and/or may utilize a common batch size to determine all the statistics.

Additionally, or alternatively, post-training transformations may be employed to ensure interoperability between the WTRU side and the NW side models. To ensure compatibility between the WTRU side model (e.g. encoder) and NW side model (e.g. decoder) a transformation function T(.) may be identified or trained based on either a subset of data points from the training data or on a separate set of data points. The transformation T(.) may be linear and/or non-linear. The transformation may be applied to the encoder output, before it is fed to the decoder output. The transformation may be hosted and/or applied at the WTRU side before transmission and/or at the NW side post receiving the information from the WTRU side. Correlation and/or mean related statistics may be used during the training of the WTRU-side models. Post-training, a linear transformation may be used to align the latent space of the WTRU-side encoder model with the NW-side decoder model.

One or more examples for interoperable training described herein may not be restricted to specific types of collaboration between entities such as WTRU, NW, and/or operators. These solutions may be applied more generally to any training scenario. For example, methods described for interoperable training may be applied to joint training of a two-sided model at a single entity, joint training of a two-sided model at the NW and WTRU sides respectively, or separate training at both the network side and the WTRU side. Joint training may refer to the scenario where the generation model and the reconstruction model are trained in the same loop for forward propagation and backward propagation. Joint training may be conducted at a single node and/or across multiple nodes (e.g., through gradient exchange between nodes). Separate training may include sequential training starting with WTRU-side training or sequential training starting with NW-side training.

In an example of WTRU-first sequential training, the WTRU may train the encoder model. The WTRU may determine an association between the properties and/or characteristics of two or more samples in the input space and the properties and/or characteristics of those samples in the latent space of the trained encoder model. In one solution, these properties and/or characteristics may be topology-based, and in another solution, they may be statistics-based. To enable the WTRU-first sequential training, the WTRU may transmit this association information to the network.

In an example of NW-first sequential training, the NW may train the decoder model. The NW may determine an association between the properties and/or characteristics of two or more samples in the latent space and the properties and/or characteristics of those samples in the output space of the trained decoder model. These properties and/or characteristics may be topology-based in one solution and statistics-based in another. The NW may transmit this association information to the WTRU to enable NW-first sequential training.

The WTRU may choose to define one or more methods $M_i$ for topology metric determination to be utilized for encoder-decoder training, along with the corresponding topology-based models for training. The WTRU may train the topology-based models $[T_1, \dots T_j, \dots, T_N]$. The WTRU may then transmit these topology-based models to the NW and may indicate to the NW that these topology based models should be utilized for NW side model training to ensure interoperability The WTRU may train its own encoder-decoder model in an unconstrained fashion to minimize the reconstruction loss as $$\frac{1}{N1} \sum_{i=1:N1} (D_1(E_1(H_i)) - H_i)^2.$$

The WTRU may then compute one or more statistics $[S_1, \dots, S_j, \dots S_N]$ needed to ensure interoperability in the latent, encoded, and/or compressed domain. The WTRU may share these statistics with the NW so that the NW can then train its decoder model to match the WTRU side statistics in the latent domain to ensure interoperability with the WTRU.

. One or more solutions described herein may enable the transmitter and receiver to independently train their models while using those models for joint inference. The WTRU may be configured to perform one or more actions to ensure interoperability between two AIML models. For example, a first AIML model may be deployed at the WTRU, and a second AIML model may be deployed at the network. The WTRU may transmit an interoperability report, which may contain one or more elements characterizing the latent space of the AIML model at the WTRU. The interoperability information may be shared between entities. For example, the WTRU may receive an interoperability configuration from the network. Additionally, or alternatively, the WTRU may be configured to transmit an interoperability report to the network.

The interoperability configuration and/or interoperability report may include a unique identity associated with the method $M_i$ used for topology determination, such as a method index for training the AIML model. For example, a method $M_i$ may be associated with a mechanism or metric to determine the connectivity within a given set of data points. The WTRU may be configured with a plurality of methods (e.g., M1, M2, M3, . . . MN). The WTRU may train the AIML model on a subset of methods (e.g., M1 and M3). The WTRU may report method identities (e.g., Method IDs) associated with the subset of methods (e.g., M1 and M3) used for model training in the interoperability report and/or configuration.

One or more datasets used for training the AIML model may also be reported and may include parameters used to generate the datasets and/or the dataset identifiers. The datasets may be associated with topology-based methods $M_1$ configured for training.

Additionally, or alternatively, the WTRU may be configured with a plurality of test cases. Each test case may include initial conditions, applicability conditions, datasets (including input and output), and performance requirements. For example, a test case may verify if the topology of the encoder's latent space is compatible with the topology of the decoder's latent space. A test case may verify the relationship between the topology of the input space and the latent space for a preconfigured set of data points. The WTRU may report the results of the test cases on the trained AIML model. This indication may enable interoperability by identifying a corresponding AIML model at the network side to interoperate with the WTRU-side model. For example, the WTRU may report the test cases that the trained AIML model passed, exceeded performance requirements for, or produced expected outputs. Test case results may be grouped into subsets. The WTRU may report the results for subsets of test cases, such as the average performance for each subset.

The WTRU may be configured to generate output associated with one or more preconfigured datasets using the trained AIML model. The WTRU may determine the topology information of the latent space for these preconfigured datasets. The WTRU may report this information and/or the generated output of the AIML model to the network.

An interoperability report may include an indication of the structure and/or statistics of the latent space. For example, the statistics may include one or more of first-order statistics (e.g., mean, median, and/or standard deviation), second-order, (e.g., correlation and/or covariance matrices), and/or higher-order statistics (e.g., eigenvectors, eigenvalues, and/or skewness).

The report may also include additional training-related parameters, such as training hyperparameters (e.g., random seed and/or optimizer), model hyperparameters (e.g., (architecture and/or backbone), encoder complexity information (e.g., a number of parameters and/or FLOPS), the number of layers, regularization, regularization parameters, and/or training loss functions.

The WTRU may report information about model performance and key performance indicators (KPIs). This information may include the metrics used to evaluate model performance and the performance values achieved by the encoder. The interoperability report may include performance results for each of the reported topology-based methods $M_i$.

The WTRU may be configured to transmit an indication of one or more reference models associated with training the AIML model. The WTRU may be configured with a plurality of reference models (e.g., reference model A, reference model B, . . . reference model z), to enable training of the first AIML model. The WTRU may select a subset of reference models (e.g., reference model x, reference model y and/or reference model z) based on one or more of applicability conditions, WTRU capability, and/or performance targets. These WTRU may select a subset of the reference models based on one or more of supported architectures, hardware support, and/or a trade-off between size, complexity, latency, and/or power consumption. The WTRU may transmit an indication of the reference models used for training its AIML model, which may be utilized to facilitate interoperability with the NW-side model.

The WTRU may transmit an interoperability report for all available models at the WTRU. The WTRU may transmit an interoperability report for a subset of models explicitly configured for interoperability reporting, which may be based on a gNB request. The subset of models may include currently activated models. The subset of models may be preconfigured for performance monitoring, and/or preconfigured for WTRU capability reporting.

The WTRU may be configured to ensure that the WTRU-side model is compatible with the NW-side model. The WTRU may be configured to check the compatibility of its own model with the NW side model before activating the model. The WRTU may be configured to check the compatibility of its own model with the NW side model before monitoring performance of the model. The WTRU may be configured to check the compatibility of its own model with the NW side model before selection of the model for inference. The WTRU may be configured to perform inference with the WTRU side AIML model to verify compatibility with the NW side AIML model.

Compatibility testing may be performed during topology-based training. The WTRU may utilize the trained encoder, $E_1$, to encode a pre-defined test dataset to estimate the dataset in the latent space (or compressed domain) $E_1(H_i)$. In the data space, $H_i$ and in the encoded data space $E_1(H_i)$. the WTRU may estimate topological features based on one or more topology-based methods. If the topological features are matching (similarity or distance between them are below a threshold), the WTRU side model may be considered compatible with the predefined test data. Further, the WTRU may share the encoded/compressed data, $E_1(H_i)$ with the NW, where the NW may perform similar evaluation and comparison of topological features between the latent and reconstructed data spaces. If the topological features are matching (e.g., a similarity or distance between them are below a threshold), the NW side model may be considered compatible with the predefined test data and therefore may be considered effectively compatible with the WTRU side model.

The WTRU and/or the NW may utilize their respective trained encoder models, $E_1$, $E_2$, to encode a pre-defined test dataset to estimate the dataset in the latent space and/or compressed domain $E_1(H_i),E_2(H_i)$. The WTRU and NW may then construct the simplicial complex based on a predefined method. The WTRU may then share the connectivity information with the NW so that the NW can evaluate and check whether the connectivity information is preserved across both the encoders. The WTRU and/or the NW may extract topological features from the simplicial complex and may then compare those features.

The WTRU may utilize a set of predefined test related topology-based methods $$[M_1^t, \ldots , M_N^t]$$

for checking the performance of the WTRU side model. This set of test related topology may include evaluating methods, which may or may not be limited to the set of methods $M_1$ utilized for model training. The WTRU may determine measurements of the performance of the WTRU encoder (e.g., the encoded dataset) on each of these topology-based methods (e.g., $M_i$), and/or may indicate to the NW for which of N (e.g., one or more) test topology-based methods (e.g., $$(M_1^t)$$

) did the WTRU model achieve at least the minimum performance KPI and/or threshold. The NW may select a decoder model and/or its corresponding encoder model that also satisfies one or more of these test topology-based methods (e.g., $$(M_1^t)$$

).

For compatibility testing during statistics-based training, the WTRU may evaluate one or more statistics, such as mean, covariance, and/or eigenvectors, over a predefined test dataset in the latent space and share this data with the NW. The NW may evaluate the same statistics over the same dataset in the latent space corresponding to the NW-side model. The NW may then compare its statistics to those of the WTRU to determine compatibility between the WTRU and NW.

Examples described herein for compatibility and/or interoperability may also be applied to performance monitoring. For example, the WTRU may be configured to transmit the performance monitoring report and/or metric with the contents described herein for the compatibility report. The compatibility report may be transmitted as part of WTRU capability, functionality identification, model identification and/or WTRU assistance information procedures. The performance monitoring report may be transmitted during performance monitoring procedure.

At inference time, the WTRU may determine one or more statistics, such as mean, covariance, and/or eigenvectors, over data samples observed during a period of time (e.g., over a window of past one second of CSI samples) in the compressed and/or latent space. The WTRU may compare these determined statistics with data statistics associated with the training dataset to estimate any deviations in the data statistics and/or impact on the overall model performance. The WTRU may utilize the top-k principal components (PC) of the latent space corresponding to a pre-defined energy threshold (e.g., the top 5 PCs may conserve over 95% of the energy in the training dataset) for model performance monitoring. At inference time, the WTRU may compress and/or decompress the encoded data samples using the PCs and/or check whether the energy greater than a pre-defined threshold is conserved.

The WTRU may monitor the performance of the AIML model as a function of topology metrics. The WTRU may measure at least one metric based on the topology of the input and latent space associated with the AIML model. The WTRU may infer the performance of a use case, for example, CSI compression, based on the topology metric of one or more data samples. These samples may be defined as the last N samples in time, a combination of the last N samples and M predefined samples, and/or a combination of recent samples and data from the training data. The WTRU may be configured with one or more topology metrics $T_1, \ldots, T_N$, and for each topology metric an associated performance threshold $P_1, \ldots, P_N$. The WTRU may determine that the performance of AIML model for a use case (e.g., CSI compression) is below a threshold when the value of at least K topology metrics for the AIML model is below its associated performance threshold. The WTRU may determine that the performance of AIML model for a use case (e.g., CSI compression) is below a threshold when the value of at least K topology metrics for the AIML model is not above the associated performance threshold. In one or more examples herein, the term topology metric may include any statistics metric and vice versa. The terms topology metric and topology features may be used interchangeably.

The WTRU may be configured to monitor performance of a AIML model based on one or more statistics associated with the latent space of the AIML model. For example, the WTRU may measure the latent space statistics during and/or after training and during inference. The WTRU may determine the performance of the AIML model as a function of the difference of statistics between training and inference. For example, if the statistics of the latent space during inference match (e.g., differ by less than a preconfigured threshold) with the statistics of the latent space during inference, then the WTRU may report that the model is operating in-distribution. Otherwise, the WTRU may report that the model is operating out-of-distribution. The WTRU may measure one or more statistics (e.g. mean, covariance, and/or eigenvectors) over samples observed during a pre-configured period of time in the compressed and/or latent space. The WTRU may measure in latent space the energy conserved by PCs of the of the training data and/or compare the measured statistic with a reference statistic (e.g., a network configured statistic and/or a WTRU determined statistic (e.g., similarity with training data). If the measured statistic differs from reference statistic by a threshold, then an out-of-distribution even may be reported to the network.

The inference time statistics may be determined based on the last N data samples used for inference. The training time statistics may be determined based on a set of N predefined data samples. The training time statistics may be determined based on N random (e.g., uniformly distributed) data samples. In an example, the statistics may be the amount of energy captured by the principal components of the data samples. The WTRU may be configured to monitor the topology metric of input and latent space. The monitoring may be conducted for a set of preconfigured samples and/or preconfigured time interval. If the topology metric (e.g., topology loss) between input and latent space is above a threshold, then the WTRU may report out of distribution to the network. The network may determine out of distribution operation if the topology loss of latent space and output space at the decoder exceeds a threshold.

The WTRU may be configured to transmit the performance report periodically. The WTRU may be configured to transmit performance monitoring report when the performance of the AIML model is below a preconfigured threshold. The WTRU may be configured to transmit performance monitoring report when the performance of the AIML model is below a preconfigured threshold.

The WTRU may be configured to report the performance of the AIML model on all the topology metrics. The WTRU may be configured to report the performance of AIML model on different topology metrics with different periodicity. For example, a AIML model performance on a subset of topology metrics (T1, . . . TH) may be configured to be reported more frequently. An AIML model performance on a subset of second topology metrics (TK, . . . TL) can be configured to be reported less frequently. For example, the WTRU may report AIML model performance on a second subset of topology metric (TK, . . . TL) when the performance of AIML model on the first subset of topology metric (T1, . . . , TH) is below a threshold.

The WTRU may be configured to perform model selection for inference as a function of the AIML model performance on one or more of the configured topology metrics. For example, a subset of topology metrics (T1, . . . , TS) and performance thresholds (P1, . . . PS) may be configured for model selection. The WTRU may be configured to select a AIML model for inference only if the AIML model performance on the topology metrics (T1, . . . TS) exceeds the respective thresholds (P1, . . . PS). If multiple AIML models satisfy the condition, then the WTRU may be configured to select the model that has the best performance on most of the topology metrics. If multiple AIML models satisfy the condition, then the WTRU may be configured to select the model that has the best average performance on all the topology metrics. If multiple AIML models satisfy the condition, then the WTRU may be configured to select the AIML model whose lowest performance on all preconfigured topology metrics is the maximum among all the AIML models.

The WTRU may be configured to fallback to non-AIML operation if one or more triggers for transmission of performance report is triggered and/or no available AIML model at the WTRU satisfies the performance requirement.

In the context of a CSI use case, upon activation of an AIML model for inference, during each reporting instance (e.g., CSI feedback), the WTRU may derive encoded input $H_i$ (e.g., channel matrix) in latent space $E(H_i)$, apply preconfigured quantization to the encoded representation $E(H_i)$, and/or report the quantized representation as compressed CSI feedback.

In one example, a method for training a two-sided model (e.g., for CSI compression) may involve the WTRU training the WTRU-side model, and the NW training the NW-side model independently. This method may be used to satisfy topology, geometry, and/or structure-related criteria. Interoperability between the WTRU and the NW during inference may be achieved by ensuring that the topology or structure of the training data points in the compressed or latent space maintains the same topology and/or structure of the training data points as in the input data space. The same concept of topology may also be applied during the training of models at both entities. The training may be performed serially or sequentially, to ensure that the topology, post mapping, is preserved across both entities in the latent and/or compressed space. Additionally, or alternatively, the two entities may train their models without coordination, while ensuring that the data topology in both their latent spaces satisfies predefined conditions and/or metrics.

The WTRU may be configured with one or more methods $M_i$ for evaluating the data topology or structure during WTRU-side model training. These methods may include a single metric or method (e.g., M1) and/or a set of methods (e.g., M1, M2, . . . MN. Each method $M_i$ may be used to identify the algebraic topology through simplicial complexes. The WTRU may be configured with the degree of simplicial complex, where a 0-degree complex refers to unconnected points, a 1-degree complex to an undirected graph, and a 2-degree complex to triangles. The WTRU may be configured to extract features representing the topology (e.g., using persistent homology to determine the number of holes, information about the holes, bar codes, persistence diagrams, and/or persistence pairings. The WTRU may measure data topology through the Hodge Laplacian (e.g., graph Laplacian operator) by taking the eigen decomposition of the Laplacian matrix.

Each method $(M_i)$ may be associated with several components. These may include one or more of a logical identification, a mapping $f_i(.)$, used to map input data before evaluating connectivity, a distance measure or metric for identifying connected components, a weighting factor $\lambda_i$, a degree for constructing the simplicial complex, and a loss function $L_1$ used for regularization. Each method $M_i$ may be further associated with a subset of the dataset such that the method $M_i$ may be used for training only with samples corresponding to the subset $A_i \subset A$, where A is the complete dataset. The WTRU may be configured with a performance metric and/or requirement for each topology-related method $M_1$, such as normalized mean square error (NMSE), squared generalized cosine similarity (SGCS), and/or classification accuracy. The WTRU may be configured with a key performance indicator (KPI) and/or a minimum performance threshold for each metric associated with each method $M_i$.

The WTRU may be configured with one or more encoder-decoder parameters, such as latent dimension, loss function for auto-encoding, and/or a performance metric for the topology-based method. The performance metric for the autoencoder may include, for example, NMSE and/or SGCS, and the KPI may define the minimum performance threshold for each metric. The WTRU may transmit an indication related to compatibility (e.g., interoperability information in model identification) or the WTRU side model with respect to the NW side models. This indication may include the identity of the method or metric used for topological compatibility testing, the identity of the test data used for compatibility testing, the topology and/or connectivity of the test data set in the latent space, the topological features of the test data set in the latent space, and/or the value of topological loss between the data in the input space and in the latent space.

The WTRU may perform performance monitoring based on the topology of the input space and/or the latent space. For a set of samples observed over a preconfigured period of time, the WTRU may determine measurements for the topology of the samples in both the input space and the latent space. If the two topologies and/or the features associated with the topologies are mismatched (e.g., a topological loss between the input and latent space exceeds a threshold), the WTRU may report an out of distribution condition to the network. If the topology and/or associated topological features of the latent samples differ from the decompressed samples at the NW side, the NW-side model may be expected to perform poorly.

In an example including model training, the WTRU may train an AI/ML model based on topology-based regularization. The WTRU may train its encoder model to enforce the same topology in the latent space that was observed in the input data space. For each method $(M_i)$, the WTRU may map data into the latent space, measure the topology-related features, and/or minimize the corresponding loss function. The WTRU may utilize a predefined topology and/or topological features (e.g., defined by the NW and/or by the standards) and/or may enforce the topology of the datasets in the latent space to match the predefined topology.

In an example of statistics-based interoperability, a method may be used for checking the interoperability of a two-sided model (e.g., for CSI compression), where the WTRU trains the WTRU-side model, and the NW trains the NW-side model independently. Statistics associated with the latent space of the WTRU-side model and those of the NW-side model may be compared to verify their interoperability. The same concept of statistics may also be utilized during the training of the models at both entities. Training may be performed serially or sequentially, ensuring that the data statistics, post-mapping, in the latent or compressed space of one entity, are preserved at the other entity. In an example, the two entities may train their models without coordination, provided the data statistics in both their latent spaces satisfy predefined statistics.

The WTRU may be configured with a plurality of testing datasets, where each dataset may be associated with one or more of deployments, vendors, additional WTRU/NW conditions, metrics, and/or statistics. Each dataset may be associated with a Dataset ID, and/or with one or more applicable conditions. The datasets may be configured as distributions of parameters, which may be expressed, for example, as fundamental channel parameters (e.g., decomposed channel) and/or 3GPP channel model parameters (e.g., UMA, CDL, Doppler, and/or delay.

One or more statistics or statistical parameters may be evaluated and/or enforced in the latent space during WTRU-side model training. Examples of such statistics may include first-order statistics (e.g., data mean), second-order statistics (e.g., data variance, correlation matrix, and/or covariance matrices), higher-order statistics, and/or eigenvectors and/or eigenvalues (e.g., the top three eigenvectors and/or eigenvalues).

A weighting factor $\lambda_i$ may be associated with each of the statistics. Each statistics-based interoperability may be associated with a specific and/or minimum batch size to ensure that the statistics are computed meaningfully. For example, fewer samples may be needed for calculating the mean, whereas a greater number of samples may be required to compute higher-order (e.g., $N^{th}$ order) moments. A loss function $L_i$ may be associated with each of the statistics. For example, an L2 loss between the actual data mean and the desired mean may be represented by $$\left|\sum E(H_i) - M_i\right|_2^2.$$

An L2 loss between the actual data correlation matrix and the desired correlation matrix may be represented by $$\left|\sum E(H_i)^T E(H_i) - C_{EE}\right|_2^2.$$

A SGCS between the eigenvectors may be represented by SGCS ($V_{HH}$, $V_D$).

The WTRU may be configured with performance thresholds for each statistic. For example, the gap between the data mean should be less than 0.05 and/or the top three eigenvectors should have a cosine similarity of 0.95 or more. The WTRU may be configured with model-related parameters, including one or more of latent dimension and/or loss function for auto-encoding. The performance metrics and/or requirements for each statistics-based interoperability method may include metrics for performance of the auto-encoder (e.g., NMSE and/or SGCS), and a KPI may be included as a minimum performance threshold for each metric.

The WTRU may perform performance monitoring based on one or more latent space statistics. The WTRU may measure one or more statistics (e.g., mean, covariance, and/or eigenvectors), over samples observed during a pre-configured period in the compressed and/or latent space. The WTRU may measure the energy conserved by the PCs of the training data in the latent space. The WTRU may compare the measured statistics with a reference statistic (e.g., network-configured and/or WTRU-determined), based on the similarity to the training data. If the measured statistic differs from the reference statistic by a threshold, the WTRU may report an out-of-distribution condition to the network.

The WTRU may use latent space statistics during AI/ML model training based on statistics-based regularization. In statistics aware training, the WTRU may be configured with one or more desired latent space statistics and/or their corresponding loss functions. At each update step, the WTRU may compute the data for the whole batch in the latent space, evaluate the specified statistics, and/or update the model weights to minimize the autoencoder loss and/or the loss associated with each of the predefined data statistics. The training may continue until a stopping criterion for data statistics and/or reconstruction loss is met. The WTRU may train its encoder model, determine the statistics of the latent space, and/or enforce some or all of the statistics and/or desirable properties for the latent space during and/or post training.

When sequential training is performed (e.g., WTRU first training), the WTRU may compute the data statistics in the latent space and/or report them to the gNB. This may include the first-order statistics (e.g., data mean), second-order statistics, higher-order statistics, and/or eigenvectors and/or eigenvalues, which may include determining a number of eigenvalues and/or eigenvectors to be used (e.g., top 3 eigenvectors and/or eigenvalues).

For each reporting instance (e.g., CSI feedback), the WTRU may derive the encoded input $H_i$ (e.g., a channel matrix) in the latent space $E(H_i)$ and/or may apply a pre-configured quantization to the encoded representation $E(H_i)$. The WTRU may report quantized representation as compressed.

The invention claimed is:

1. A wireless transmit/receive unit (WTRU) comprising: a processor configured to:
   receive configuration information, the configuration information comprising an indication of one or more topology methods used to evaluate a topology of a dataset, a metric associated with at least one topology method, and an identification associated with each of the one or more topology methods;
   select a topology method from the one or more topology methods indicated by the configuration information;
   determine topological features of the dataset in an input data space using the selected topology method, and determine topological features of the dataset in a latent space using the selected topology method;
   compare the topological features of the dataset in the input space to the topological features of the dataset in the latent space to determine whether a WTRU-side model satisfies a metric associated with the selected topology method; and
   send an interoperability report, wherein the interoperability report comprises an identification associated with the selected topology method and an indication of whether the WTRU-side model satisfies the metric associated with the selected topology method, wherein a determination of whether the WTRU-side model satisfies the metric associated with the selected topology method comprises training the WTRU-side model such that the topological features of the dataset in the input space and the topological features of the dataset in the latent space satisfy the metric associated with the at least one topology method.

2. The WTRU of claim 1, wherein the WTRU-side model is associated with an encoder that is used for channel state information (CSI) generation.

3. The WTRU of claim 1, wherein each of the one or more topology methods comprises an algorithm used to evaluate the topology of one or more datasets with the WTRU-side model to achieve interoperability between the WTRU-side model and a Network-side model.

4. The WTRU of claim 1, wherein each of the one or more topology methods is associated with a methodology to find a connectivity or topology in a given set of datapoints for a dataset, wherein the methodology to find a connectivity comprises determining one or more simplicial complexes based on one or more of a predefined distance metric or similarity metric.

5. The WTRU of claim 1, wherein the configuration information further comprises an indication that the dataset is associated with the selected topology method.

6. The WTRU of claim 1, wherein the identification associated with each of the one or more topology methods identifies one or more use-cases that are associated with the topology method.

7. The WTRU of claim 1, wherein the processor is configured to:

determine a performance metric associated with the selected topology method, wherein the performance metric associated with the selected topology method comprises one or more of Normalized Mean Square Error (NMSE), Squared Generalized Cosine Similarity (SGCS), or a classification accuracy.

8. The WTRU of claim 1, wherein the interoperability report further comprises (i) an identity of a test data set used for interoperability testing, (ii) an indication of a topology of the test data set in the latent space, (iii) an indication of topological features of the test data set in the latent space, or (iv) a value of topological loss between the test data set in the input data space and the test data set in the latent space.

9. The WTRU of claim 1, wherein the indication of whether the WTRU-side model is compatible with the dataset comprises at least a portion of the dataset in the latent space.

10. The WTRU of claim 1, wherein the processor is further configured to:

train the WTRU-side model by determining one or more pair-wise distances between samples in the dataset using a predefined distance metric;

determine one or more simplicial complexes based on the pair-wise distances, wherein each simplicial complex corresponds to a minimum spanning tree;

determine minimum spanning trees associated with one or more of data points in both the input data space and the latent space;

determine the topological features by comparing the minimum spanning trees of the input data space and the latent space; and update the WTRU-side model based on the comparison to enforce similarity in topology between the input data space and the latent space.

11. A method implemented by a wireless transmit/receive unit (WTRU), the method comprising:

receiving configuration information, the configuration information comprising an indication of one or more topology methods used to evaluate a topology of a dataset, a metric associated with at least one topology method, and an identification associated with each of the one or more topology methods;

selecting a topology method from the one or more topology methods indicated by the configuration information;

determining topological features of the dataset in an input data space using the selected topology method, and determine topological features of the dataset in a latent space using the selected topology method;

comparing the topological features of the dataset in the input space to the topological features of the dataset in the latent space to determine whether a WTRU-side model satisfies a metric associated with the selected topology method; and sending an interoperability report, wherein the interoperability report comprises an identification associated with the selected topology method and an indication of whether the WTRU-side model satisfies the metric associated with the selected topology method;

wherein a determination of whether the WTRU-side model satisfies the metric associated with the selected topology method comprises training the WTRU-side model such that the topological features of the dataset in the input space and the topological features of the dataset in the latent space satisfy the metric associated with the at least one topology method.

12. The method of claim 11, wherein the WTRU-side model is associated with an encoder that is used for channel state information (CSI) generation.

13. The method of claim 11, wherein each of the one or more topology methods comprises an algorithm used to evaluate the topology of one or more datasets with the WTRU-side model to achieve interoperability between the WTRU-side model and a Network-side model.

14. The method of claim 11, wherein each of the one or more topology methods is associated with a methodology to find a connectivity or topology in a given set of datapoints for a dataset, wherein the methodology to find the connectivity comprises determining one or more simplicial complexes based on one or more of a predefined distance metric or similarity metric.

15. The method of claim 11, wherein the configuration information further comprises an indication that the dataset is associated with the selected topology method.

16. The method of claim 11, wherein the identification associated with each of the one or more topology methods identifies one or more use-cases that are associated with the topology method.

17. The method of claim 11, further comprising:

determining a performance metric associated with the selected topology method, wherein the performance metric associated with the selected topology method comprises one or more of Normalized Mean Square Error (NMSE), Squared Generalized Cosine Similarity (SGCS), or a classification accuracy.

18. The method of claim 11, wherein the interoperability report further comprises (i) an identity of a test data set used for interoperability testing, (ii) an indication of a topology of the test data set in the latent space, (iii) an indication of topological features of the test data set in the latent space, or (iv) a value of topological loss between the test data set in the input data space and the test data set in the latent space.

19. The method of claim 11, further comprising:

training the WTRU-side model by determining one or more pair-wise distances between samples in the dataset using a predefined distance metric;

determining one or more simplicial complexes based on the pair-wise distances, wherein each simplicial complex corresponds to a minimum spanning tree;

determining minimum spanning trees associated with one or more of data points in both the input data space and the latent space;

determining the topological features by comparing the minimum spanning trees of the input data space and the latent space; and updating the WTRU-side model based on the comparison to enforce similarity in topology between the input data space and the latent space.

20. A wireless transmit/receive unit (WTRU) comprising:

a processor configured to:

train a WTRU-side model of a two-sided model for channel state information (CSI) compression, wherein the WTRU-side model is trained independently from a network-side model to satisfy topology-related criteria;

determine a data topology for training the WTRU-side model using a single method $M_i$, wherein the method $M_i$ is configured to:

identify the topology of received input data;

extract topological features from the received input data; map the input data prior to evaluating connectivity in the data topology;

evaluate connected components of the input data using a distance measure and apply a weighting factor;

enforce a pre-defined topology in a latent space of the WTRU-side model to match a topology defined by at least one of the network-side model or by a standard; and transmit an indication related to topological compatibility testing of the WTRU-side model with respect to the network-side model, wherein the indication includes an identity of the method used for compatibility testing and topological features of a test data set in the latent space.

* * * * *